US 11,364,833 B2

(12) United States Patent
Berghammer

(10) Patent No.: US 11,364,833 B2
(45) Date of Patent: Jun. 21, 2022

(54) DEVICE FOR LOAD TRANSFER

(71) Applicant: LR Intralogistik GmbH, Woerth an der Isar (DE)

(72) Inventor: Fritz Berghammer, Landshut (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 348 days.

(21) Appl. No.: 16/651,967

(22) PCT Filed: Aug. 21, 2018

(86) PCT No.: PCT/EP2018/072500
§ 371 (c)(1),
(2) Date: Mar. 27, 2020

(87) PCT Pub. No.: WO2019/063201
PCT Pub. Date: Apr. 4, 2019

(65) Prior Publication Data
US 2020/0254916 A1    Aug. 13, 2020

(30) Foreign Application Priority Data
Sep. 29, 2017    (DE) .................... 10 2017 122 704.0

(51) Int. Cl.
*B60P 1/38*    (2006.01)
*B60R 16/033*    (2006.01)
(Continued)

(52) U.S. Cl.
CPC .............. *B60P 1/38* (2013.01); *B60R 16/033* (2013.01); *B65G 37/005* (2013.01);
(Continued)

(58) Field of Classification Search
None
See application file for complete search history.

(56) References Cited

U.S. PATENT DOCUMENTS 3,322,913 A * 5/1967 Bradstock .............. G21C 13/02
                                                      200/61.42
3,998,343 A * 12/1976 Fors ....................... B60P 1/006
                                                      414/521
(Continued)

FOREIGN PATENT DOCUMENTS

DE     102009016743 A1   10/2010
DE     202013102199 U1    8/2013
(Continued)

*Primary Examiner* — Joseph A Dillon, Jr.
(74) *Attorney, Agent, or Firm* — The Webb Law Firm

(57) ABSTRACT

The invention relates to a device comprising a stationary transfer station (3) and a trailer train (1) comprising at least one trailer-train trailer (2), for transferring loads (L) from the trailer-train trailer (2) into the stationary transfer station (3), the trailer-train trailer (2) being provided with a continuous conveyor (25) driven by a motor (27), for receiving the load (L). The motor (27) of the continuous conveyor (25) of the trailer-train trailer (2) is powered by a battery (6) of the trailer train (1). Another continuous conveyor (30) driven by another motor (32) is arranged in the transfer station (3), for receiving the load (L), the other motor (32) of the other continuous conveyor (30) being powered in the transfer station (3) in a pre-determined handling position by the battery (6) of the trailer train (1).

21 Claims, 6 Drawing Sheets

(51) Int. Cl.
*B65G 37/00* (2006.01)
*B65G 65/00* (2006.01)

(52) U.S. Cl.
CPC ...... *B65G 65/005* (2013.01); *B65G 2203/042* (2013.01); *B65G 2814/0352* (2013.01)

(56) References Cited

U.S. PATENT DOCUMENTS

| | | | | |
|---|---|---|---|---|
| 4,286,911 | A * | 9/1981 | Benjamin | B65G 1/0414 |
| | | | | 191/1 R |
| 4,541,768 | A * | 9/1985 | Walker | B64F 1/322 |
| | | | | 414/535 |
| 4,792,995 | A * | 12/1988 | Harding | H04B 10/801 |
| | | | | 398/107 |
| 4,944,357 | A | 7/1990 | Wible et al. | |
| 5,202,832 | A * | 4/1993 | Lisy | G05D 1/0236 |
| | | | | 414/351 |
| 5,482,425 | A * | 1/1996 | Podd, Jr. | B60P 1/38 |
| | | | | 220/729 |
| 5,664,929 | A | 9/1997 | Esaki et al. | |
| 6,524,057 | B1 * | 2/2003 | Park | H01L 21/67724 |
| | | | | 187/244 |
| 7,784,407 | B2 * | 8/2010 | Di Rosa | B65G 1/0414 |
| | | | | 414/281 |
| 8,509,981 | B2 * | 8/2013 | Pfeiffer | B60L 53/14 |
| | | | | 701/23 |
| 9,176,502 | B2 * | 11/2015 | Furuno | G05D 1/0234 |
| 9,738,465 | B2 * | 8/2017 | Berghammer | B65G 69/24 |
| 9,919,798 | B2 * | 3/2018 | Haertel | B64D 9/00 |
| 10,052,995 | B2 * | 8/2018 | Berghammer | B60P 7/08 |
| 10,230,315 | B2 * | 3/2019 | Ramezani | B65G 21/14 |
| 10,377,434 | B2 * | 8/2019 | Berghammer | B62D 63/061 |
| 10,449,886 | B2 * | 10/2019 | Richardson | B60P 1/38 |
| 10,787,108 | B2 * | 9/2020 | Vollmering | B60P 1/006 |
| 10,894,663 | B2 * | 1/2021 | Kapust | B65G 1/0492 |
| 11,235,931 | B2 * | 2/2022 | Paterson, Jr. | B65G 65/00 |
| 11,273,748 | B2 * | 3/2022 | Albright | B60P 1/30 |
| 2016/0101948 | A1 * | 4/2016 | Berghammer | B60P 1/02 |
| | | | | 414/349 |
| 2017/0021754 | A1 * | 1/2017 | Berghammer | B60P 1/02 |
| 2018/0170468 | A1 * | 6/2018 | Berghammer | B62D 53/005 |
| 2019/0225285 | A1 * | 7/2019 | Packeiser | F41H 7/005 |
| 2020/0130759 | A1 * | 4/2020 | Berghammer | B62D 59/04 |
| 2021/0404122 | A1 * | 12/2021 | Coots | E01B 29/32 |

FOREIGN PATENT DOCUMENTS

| | | |
|---|---|---|
| DE | 202015105184 U1 | 4/2016 |
| EP | 3150522 A1 | 4/2017 |

* cited by examiner

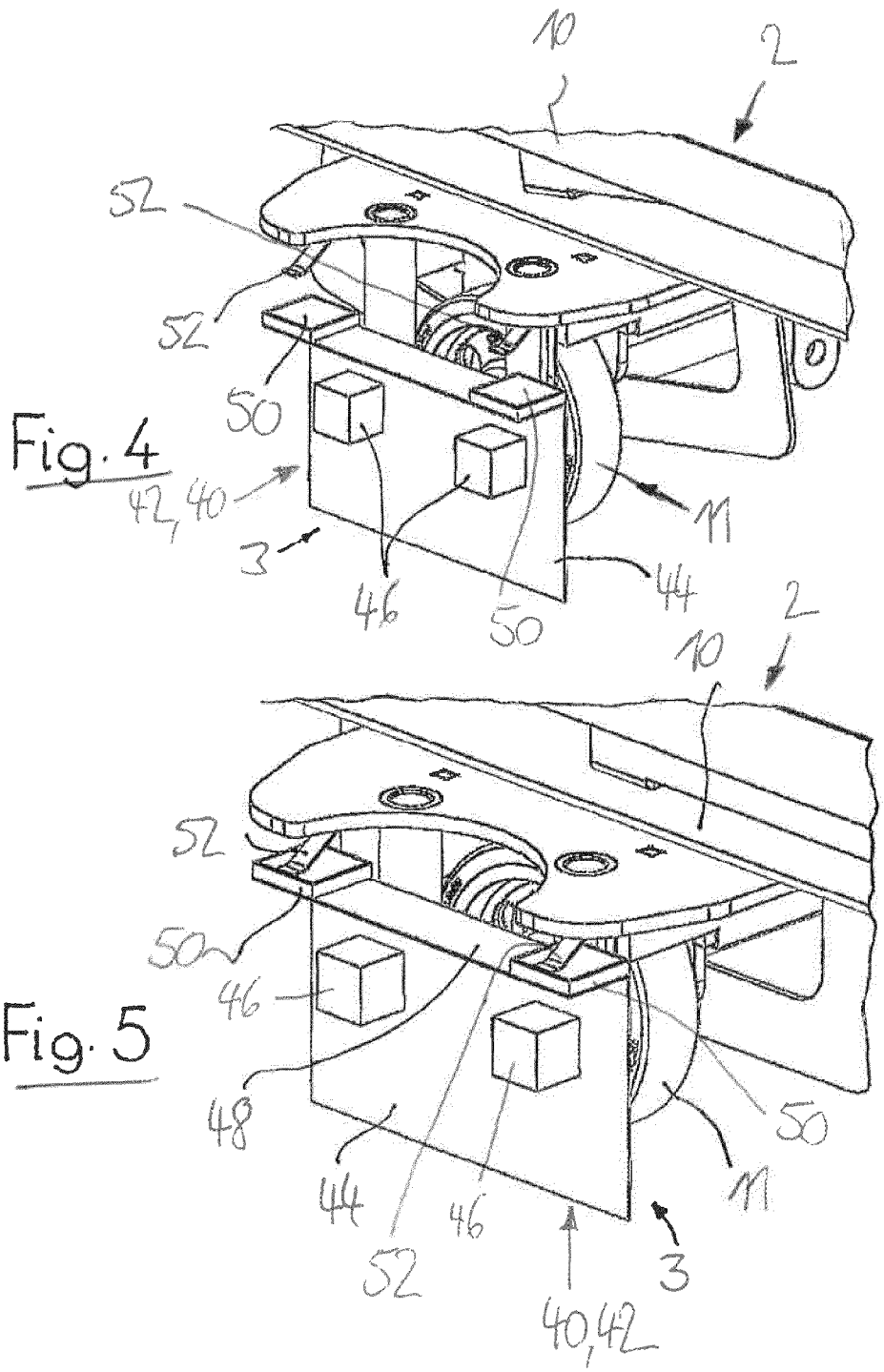

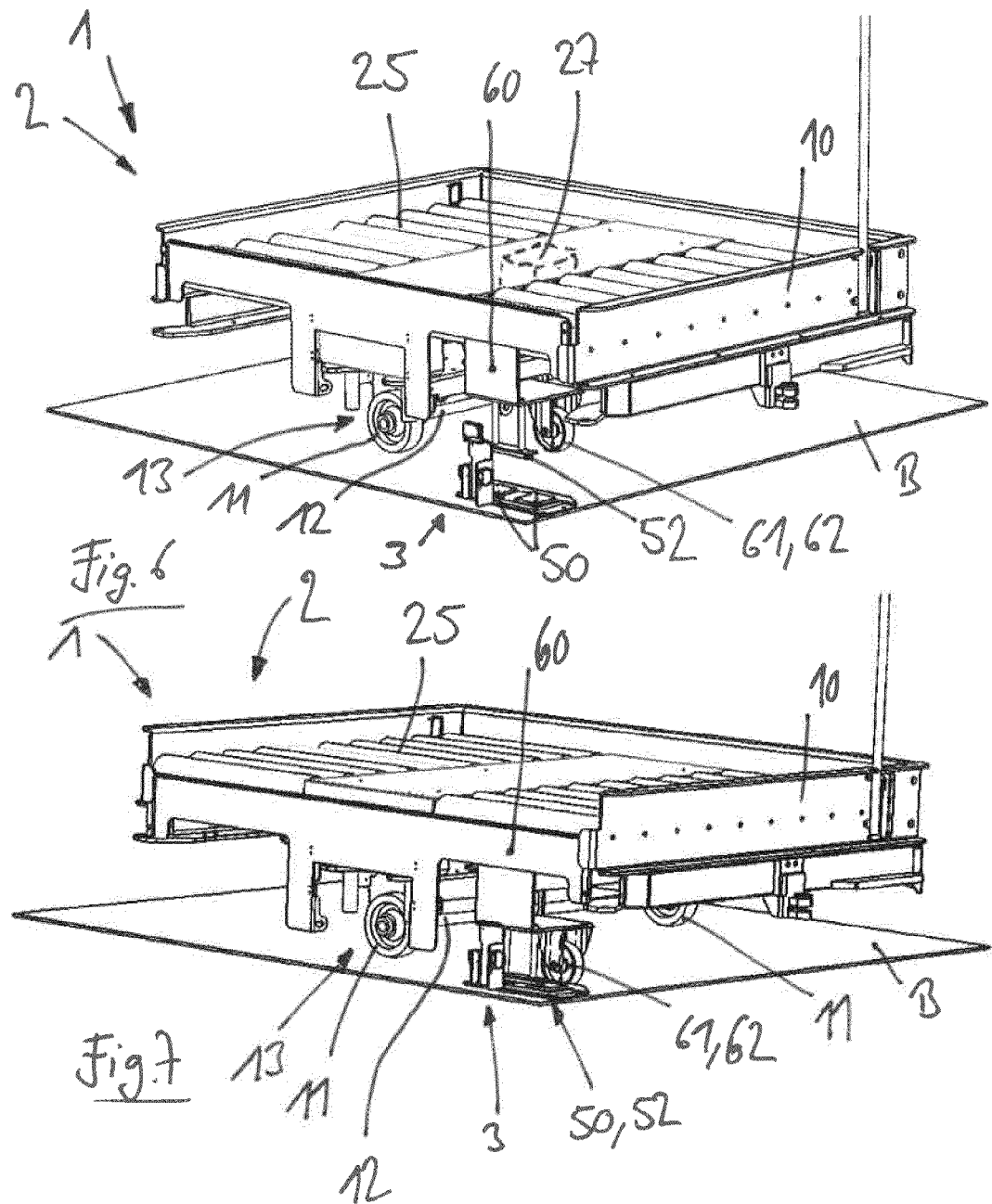

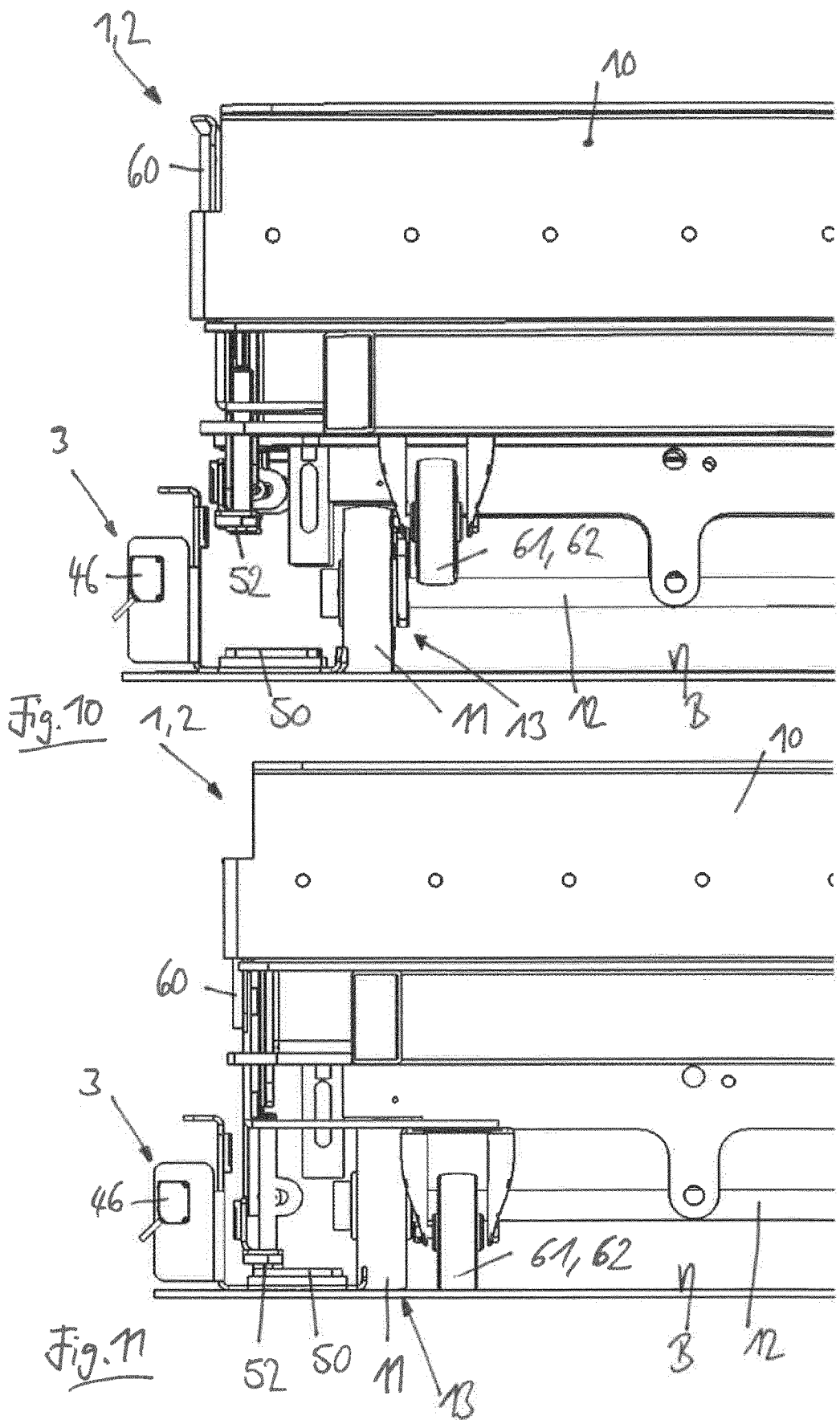

DEVICE FOR LOAD TRANSFER

CROSS REFERENCE TO RELATED APPLICATIONS

This application is the United States national phase of International Application No. PCT/EP2018/072500 filed Aug. 21, 2018, and claims priority to German Patent Application No. 10 2017 122 704.0 filed Sep. 29, 2017, the disclosures of which are hereby incorporated by reference in their entirety.

BACKGROUND OF THE INVENTION

Field of the Invention

The disclosure relates to a device including a stationary transfer station and a trailer train including at least one trailer-train trailer for transferring loads from the trailer-train trailer into the stationary transfer station, the trailer-train trailer being provided with a motor-driven continuous conveyor for receiving the load.

Description of Related Art

For the transport of loads, for example pallets or mesh boxes designed to hold loads, within a plant, increasing use is being made of trailer trains, the trailer-train trailers of which are transported to the desired transfer station by a tractor vehicle.

DE 20 2013 102 199 U1 describes a device of the above-described type for the transfer of loads from the lift table of a trailer-train trailer of a trailer train into a stationary receiving station. To make possible a simplified loading and unloading that can be done without muscle power and takes the load off the operator to the maximum extent possible, the trailer train has an integrated, motor-driven continuous conveyor. Its power is supplied by a battery that is installed in the tractor vehicle of the trailer train. In the handling position, care must be taken that the trailer-train trailer is oriented in a specified position relative to the stationary transfer station. The continuous conveyor can be displaced in the transverse direction of the trailer-train trailer by means of a sled, to deliver the load from the trailer-train trailer to the transfer station or to be able to receive the load from the transfer station on the trailer-train trailer. With the transversely movable continuous conveyor on the trailer-train trailer, a load can also be received from or delivered to a stationary transfer station. A continuous conveyor that can be moved in the transverse direction of the trailer-train trailer by means of a sled, however, requires a high level of construction effort and expense on the trailer-train trailer.

DE 20 2015 105 184 U1 describes a device of the above described type for the transfer of loads from a lift table of the trailer-train trailer of a trailer train into a stationary transfer station, whereby on the lift table there is a motor-driven continuous conveyor to receive the load, and the height of the lift table can be adjusted by means of a lifting mechanism relative to the chassis of the trailer-train trailer. On the device described in DE 20 2015 105 184 U1, the motor of the continuous conveyor of the trailer-train trailer is not connected to the battery of the tractor vehicle of the trailer train, but, in the handling position, there is a connection of the motor of the continuous conveyor of the trailer-train trailer to live contacts of the stationary transfer station. The live contacts of the transfer station can be connected to establish an electrical connection to a power network of a building in which the transfer station is located.

If an additional continuous conveyor driven by an additional motor to receive the load is also located in the transfer station, on known devices of the prior art of this type this continuous conveyor is connected for its electrical connection to a power network of a building in which the transfer station is located.

However, the need to connect the power supply of the additional motor of the transfer station that drives the continuous conveyor of the transfer station to the power network of a building has the disadvantage that in the event of a change in the installation location of the stationary transfer station, a power supply connection must also be installed in the new installation location of the stationary transfer station to be able to connect the motor of the continuous conveyor of the stationary transfer station to the power network of the building. In the event of a change in the installation location of the stationary transfer station, this entails a high level of effort and expense for the connection of the power supply of the motor of the continuous conveyor of the transfer station.

SUMMARY OF THE INVENTION

The object of this disclosure is to make available a device of the type described above in which the installation location of the stationary transfer station can be changed without requiring any installation effort or expense for the power supply connection of the motor of the continuous conveyor of the transfer station.

The disclosure accomplishes this object in that the motor of the continuous conveyor of the trailer-train trailer is supplied with power by a battery of the trailer train and that on the transfer station there is an additional continuous conveyor driven by an additional motor to receive the load, whereby the additional motor of the additional continuous conveyor on the transfer station is supplied with power in a specified handling position by the battery of the trailer train. On account of the electrical connection according to the disclosure of the additional motor of the additional continuous conveyor of the stationary transfer station to the battery of the trailer train, no electrical connection and, therefore, no power connection of the additional motor of the additional continuous conveyor of the stationary transfer station to a power network of the building is necessary, so that no electrical connection of the transfer station to a power network of the building is necessary. The installation location of the stationary transfer station can therefore be changed with little construction effort or expense because, at the new installation location of the stationary transfer station, no electrical connection with the power network of the building and, therefore, no installation effort or expense for a power connection of the motor of the continuous conveyor of the transfer station to the power network of the building are necessary.

According to one advantageous configuration of the disclosure, at least one contact is provided on the transfer station, to which, in the predetermined handling position, at least one contact of the trailer-train trailer that is in a connection with the battery of the trailer train, in particular a switch contact, can be connected, thereby closing a circuit for the power supply of the additional motor of the additional continuous conveyor on the transfer station. With at least one contact on the trailer-train trailer which is connected with the battery of the trailer train, and a corresponding mating contact on the stationary transfer station, it is possible in a simple manner, upon reaching the handling position, to establish a connection between the contact of the trailer train trailer that is in a connection with the battery of the trailer train and the contact on the transfer station and to establish a connection of the battery of the trailer train to the motor on the transfer station, to connect the motor of the continuous conveyor of the transfer station with the battery of the trailer train to supply electric power.

Advantageously a sensor device is provided on the transfer station to detect the predetermined handling position of the trailer-train trailer. With a sensor device it is possible in a simple manner to detect the predetermined handling position of the trailer-train trailer at the transfer station.

The battery of the trailer train can be formed by a battery that is located on the trailer-train trailer.

It is particularly advantageous if, according to one configuration of the disclosure, the trailer train has a tractor vehicle and a battery of the tractor vehicle provides the power supply for the motor of the continuous conveyor of the trailer-train trailer and the power supply of the additional motor of the additional continuous conveyor on the transfer station. A battery of the tractor vehicle has a correspondingly large capacity to supply the motor of the continuous conveyor of the trailer-train trailer and the additional motor of the additional continuous conveyor on the transfer station, and can be recharged in a simple manner. For this purpose, all that is necessary on the trailer train is a corresponding connection of the battery of the tractor vehicle with the corresponding trailer-train trailers, which can be easily established with a corresponding connecting cable.

In one advantageous embodiment, the contact of the transfer station is located on the floor. This arrangement results in a simple installation of the contact of the transfer station.

In one advantageous embodiment, the contact of the transfer station is attached to a stationary rail. This arrangement results in a simple installation of the contact of the transfer station.

The sensory device is also appropriately attached to the stationary rail.

It is particularly advantageous if the contact of the transfer station is attached directly to the transfer station. For example, the contact can be attached to and fastened to the transfer station in a form-fitting manner. This arrangement makes it particularly simple to change the installation location of the stationary transfer station because the transfer station can be installed together with the contact in a new installation location without having to separately fasten the contact to the floor.

It is particularly advantageous if the trailer-train trailer is provided with two contacts at a horizontal distance from each other which can be reversible to reverse the direction of rotation of the additional motor of the continuous conveyor of the transfer station. The additional continuous conveyor of the stationary transfer station can thereby perform in a simple manner either the unloading process or, in the reverse direction, the loading process.

In the handling position, the continuous conveyor driven by the motor of the trailer-train trailer is advantageously oriented at the same height as the additional continuous conveyor of the stationary transfer station. A load can thereby be moved in a simple and secure manner at the same height from the trailer-train trailer to the stationary transfer station and from the stationary transfer station to the trailer-train trailer.

The continuous conveyor of the trailer-train trailer can be in the form of a conveyor belt, a roller conveyor or a chain conveyor. The additional continuous conveyor of the transfer station can be in the form of a conveyor belt, a roller conveyor or a chain conveyor. With a conveyor belt, roller conveyor or chain conveyor, a load such as a pallet or a mesh box, for example, can be moved in a simple manner transverse to the direction of travel of the vehicle of the trailer-train trailer.

According to one advantageous embodiment of the disclosure, the trailer-train trailer has a lift table which is provided with the continuous conveyor. With a lift table on which the continuous conveyor is located, it becomes possible in a simple manner to adjust the height of the continuous conveyor of the trailer-train trailer to the height of the additional continuous conveyor of the stationary transfer station, in particular if there is a plurality of transfer stations with different height levels of the additional continuous conveyors.

The lift table is advantageously also provided with the contact. By lowering the lift table to orient the continuous conveyor of the lift table to the same height as the additional continuous conveyor of the transfer station, the contact on the lift table connected with the battery of the trailer train can therefore also be connected with the contact of the stationary transfer station to drive the motor of the additional continuous conveyor of the transfer station with electric current from the battery of the trailer train.

The height of the lift table is preferably adjustable by means of a lifting mechanism relative to a chassis of the trailer-train trailer.

It is thereby advantageous if, in the predetermined handling position, as the lift table is being lowered, the contact of the trailer-train trailer that is in connection with the battery of the trailer train strikes the contact of the transfer station. In the predetermined handling position, therefore as the lift table is being lowered into a transfer position, at least one contact that is in connection with the battery of the trailer train, in particular a switch contact, of the trailer-train trailer can strike the contact of the transfer station and thereby close the circuit to supply power to the additional motor of the additional continuous conveyor on the transfer station. With at least one contact on the lift table of the trailer-train trailer, which is in connection with the battery of the trailer train, and a corresponding mating contact on the stationary transfer station, when the handling position is reached and the lift table is lowered, the contact that is in connection with the battery of the trailer train on the lift table of the trailer-train trailer can easily be brought into a connection with the contact on the transfer station, and a connection of the battery of the trailer train to the motor on the transfer station can be established, to connect the motor of the continuous conveyor of the transfer station with the battery of the trailer train to supply electricity.

In one advantageous embodiment of the disclosure, the trailer-train trailer has a support frame that forms the lift table or holds the lift table. The lift table can therefore be located on a support frame or can be formed directly by the support frame of the trailer-train trailer.

According to one advantageous embodiment of the disclosure, the trailer-train trailer has a support frame provided with a chassis which is provided with the continuous conveyor. The trailer-train trailer is therefore in the form of a rigid trailer without a lift table, which has a particularly simple construction. With a trailer-train trailer of this type, it is possible in a simple matter to equalize the height of the continuous conveyor of the trailer-train trailer and the additional continuous conveyor of the stationary transfer station, in particular if there is a plurality of transfer stations, each with the same height level of the additional continuous conveyor.

The height of the contact on the support frame is advantageously adjustable and can be adjusted relative to the support frame of the trailer-train trailer by means of a lifting mechanism. By lowering the contact relative to the support frame that is provided with the continuous conveyor, it is thereby possible in a simple matter to connect the contact of the trailer-train trailer that is connected with the battery of the trailer train with the contact of the stationary transfer station to drive the motor of the additional continuous conveyor of the transfer station with current from the battery of the trailer train. In the predetermined handling position, as the contact, in particular a switch contact, of the contact that is connected with the battery of the trailer-train trailer is lowered, it strikes the contact of the transfer station and thereby closes the circuit for the power supply of the additional motor of the additional continuous conveyor on the transfer station. With at least one height-adjustable contact of the trailer-train trailer located on the support frame which is in connection with the battery of the trailer train, and a corresponding mating contact on the stationary transfer station it is thereby possible in a simple manner, when the handling position is reached and the contact of the trailer-train trailer that is in connection with the battery of the trailer train is lowered to connect the contact of the trailer-train trailer that is in connection with the battery of the trailer train with the contact on the transfer station and establish a connection of the battery of the trailer train with the motor on the transfer station, to connect the motor of the continuous conveyor of the transfer station with the battery of the trailer train for the electrical power supply.

In one advantageous development of the disclosure, the contact is located on a bracket, the height of which can be adjusted by means of the lifting mechanism, which bracket is provided with a support device, in particular a support roller, to support the trailer-train trailer on the floor. With the support device, by lowering it to the floor, in particular a trailer-train trailer in the form of a single-axle trailer, the axle of which is locate essentially centrally, the handling position can be stabilized in a simple matter.

It is further advantageous if the bracket is located laterally on the continuous conveyor and in the raised position projects above the height of the continuous conveyor. In the raised position the bracket therefore also performs the function of a lateral stop, with which a load located on the continuous conveyor of the trailer-train trailer can be secured against sliding sideways during the travel of the trailer train.

BRIEF DESCRIPTION OF THE DRAWINGS

Additional advantages and details of the disclosure are explained in greater detail below with reference to the exemplary embodiments illustrated in the accompanying schematic figures, in which FIG. 4 is an enlarged view of a portion of a trailer-train trailer of the first embodiment of the device according to the disclosure in the handling position with open contacts, FIG. 5 is an illustration corresponding to FIG. 4 with closed contacts, FIG. 6 shows a trailer-train trailer according to a second embodiment of the device according to the disclosure with open contacts, FIG. 7 shows a trailer-train trailer according to FIG. 6 with closed contacts, FIG. 10 is a schematic front view of the second embodiment of the device according to the disclosure with open contacts and FIG. 11 is a schematic front view of the second embodiment of the device according to the disclosure with closed contacts.

DESCRIPTION OF THE INVENTION

The device according to the disclosure illustrated in FIGS. 1 to 11 is explained below on the basis of the example of a trailer train 1 with at least one trailer-train trailer 2, whereby a load L such as a pallet or a mesh box for example is to be transferred from a trailer-train trailer 2 of the trailer train 1 in the x direction (transverse direction of the trailer-train trailer 2) to a stationary transfer station 3 or in the opposite direction from the stationary transfer station 3 to the trailer-train trailer 2 of the trailer train 1.

Figure 2:
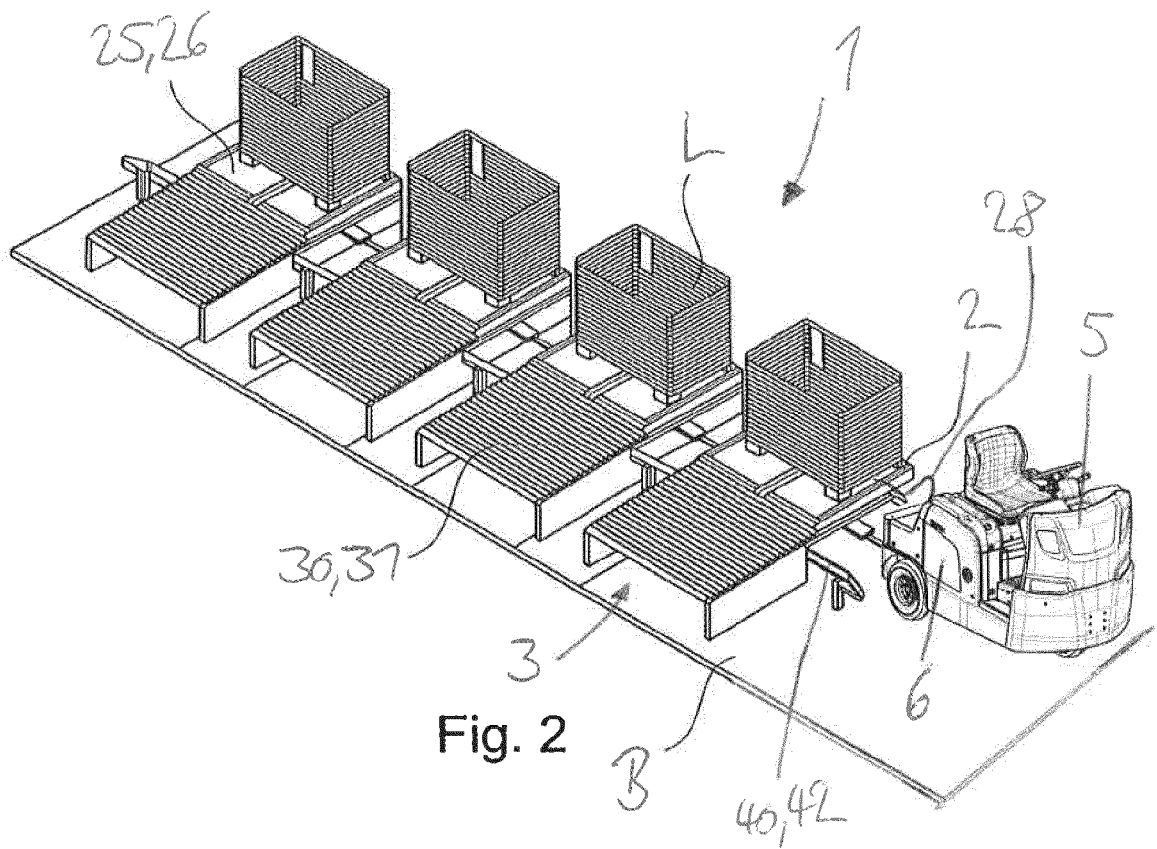
FIG. 2 is a diagonal view in perspective of a system with, in this case, four transfer stations arranged one behind the other corresponding to the first embodiment of the device according to the disclosure.
Figure 3:
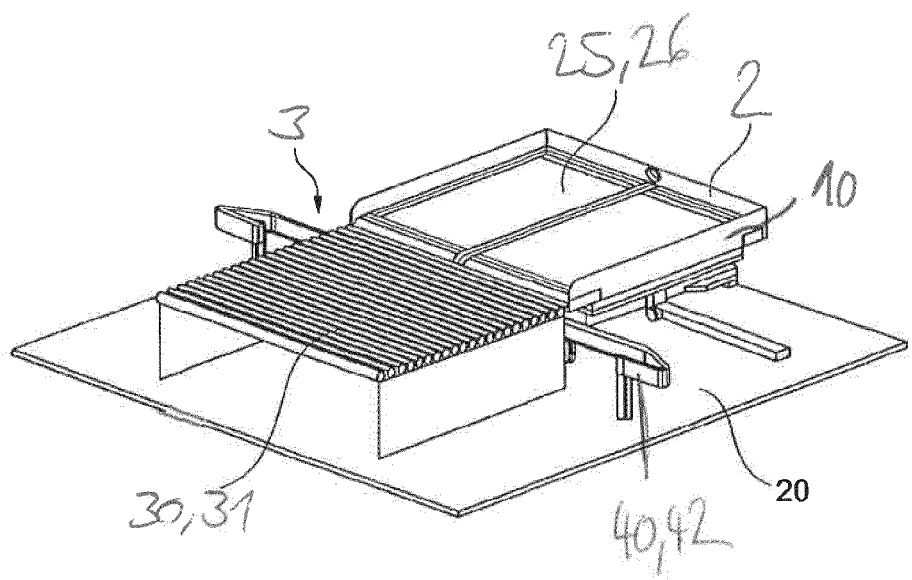
FIG. 3 is an enlarged view of a transfer device corresponding to the first embodiment of the device according to the disclosure without a load.

The trailer train 1—as illustrated in FIG. 2—has a tractor vehicle 5 which is provided with a battery 6. The tractor vehicle 5 has a battery-powered electrical drive system with an electric traction drive, whereby the battery 6 is preferably in the form of a traction battery that powers the traction drive of the tractor vehicle 5.

As shown by the exemplary embodiment illustrated in FIGS. 1 to 5 and the exemplary embodiment illustrated in FIGS. 6 to 11, the trailer-train trailer 2 has a support frame 10, which can be in the shape of an E or a C when viewed from overhead.

The support frame 10 in the illustrated exemplary embodiments can be moved on two wheels 11 on the floor B of a plant building, for example, whereby the two wheels 11, together with a rigid axle 12, are part of the chassis 13 of the trailer-train trailer 2.

The support frame 10 is provided with a continuous conveyor 25. The continuous conveyor 25 is driven by an electric motor 27. In the example illustrated in FIGS. 1 to 5, the continuous conveyor 25 is in the form of a conveyor belt 26. Alternatively, the continuous conveyor 25—as in the exemplary embodiment illustrated in FIGS. 6 to 11—can be formed by a roller conveyor that is driven by the electric motor 27.

The electric motor 27 of the continuous conveyor 25, for its power supply, is connected with the battery 6 of the tractor vehicle 5.

The stationary transfer station 3 is provided with an additional continuous conveyor 30 which is driven by an additional electric motor 32. The additional continuous conveyor 30 can be of the form of a roller conveyor 31, a conveyor belt or a chain conveyor.

In the exemplary embodiment illustrated in FIGS. 1 to 5, the support frame 10 is in the form of a lift table 20, which can be raised and lowered relative to the chassis 13 by means of at least one lifting mechanism 21.

On the trailer-train trailer 2 illustrated in FIGS. 1 to 5, the lift table 20 and with it the continuous conveyor 25 can be lowered by means of the lifting mechanisms 21 in the vertical direction y to the height of the stationary transfer station 3.

The lifting mechanisms 21 are preferably of the form of electrical lifting mechanisms which are supplied with power by the battery 6 of the traction vehicle 5.

For the electrical power supply of the electric motor 27 of the continuous conveyor 25, and/or of the lifting mechanisms 21, the trailer train trailers 2 are connected with the battery 6 of the traction vehicle 5 by means of a connection cable 28.

As illustrated in FIGS. 4 and 5, attached to the stationary transfer station 3 is a stationary rail 40, which includes an angled bracket 42. On the vertical wall 44 of the bracket 40 there are two sensors 46 separated horizontally from each other, which in a predetermined handling position of the trailer-train trailer 2 by means of mated sensors (not shown) determine the precise handling position of the trailer-train trailer 2 in which the continuous conveyor 25 of the trailer-train trailer 2 must be oriented in relation to the additional continuous conveyor 30 of the stationary transfer station 3.

The trailer-train trailer 2 is provided in the vicinity of the rail 40 with two live contacts 52 which are connected with the battery 6 of the tractor vehicle 5.

Fastened to the horizontal leg 48 of the bracket 42 at some distance from each other are two contacts 50 of the stationary transfer station 3, which are connected with the additional motor 32 of the additional continuous conveyor 30 of the stationary transfer station 3.

The contacts 52 are located on the support frame 10 of the trailer-train trailer 2 so that when the lift table 20 is lowered these contacts come into contact with the two contacts 50 of the transfer station 3. Preferably the contacts 52 of the trailer-train trailer 2 are formed by switch contacts.

When the trailer-train trailer 2 of the exemplary embodiment illustrated in FIGS. 1 to 5 has reached the transfer station 3 showed in FIG. 4, the two sensors 46 determine the position of the trailer-train trailer 2, which can still be corrected, until the predetermined handling position of the trailer-train trailer 2 relative to the stationary transfer station 3 with its continuous conveyor 30 has been reached. In response to a command from the trailer-train side, which can be given, for example, by a driver of the tractor vehicle 5 or can also be transmitted automatically, the lifting mechanisms 21 receive a signal to lower the lift table 20 until the continuous conveyor 25 of the trailer-train trailer 2 has been lowered to the same height as the continuous conveyor 30 of the transfer station 3, so that in the predetermined handling position the load L can be transferred on the same level (y=0) from the continuous conveyor 25 of the trailer-train trailer 2 to the continuous conveyor 30 of the transfer station 3 or from the continuous conveyor 30 of the transfer station 3 to the continuous conveyor 25 of the trailer-train trailer 2. When the lift table 20 is lowered, the two contacts 52 of the trailer-train trailer 2 that are in a connection with the battery 6 of the tractor vehicle 5 come into contact with the contacts 50 of the stationary transfer station 3. After a brief delay of approximately half a second, which is to prevent arcing, the trailer-side contact 52 is supplied with current from the battery 6 of the tractor vehicle 5, so that the current for the power supply the additional motor 32 of the additional continuous conveyor 30 of the stationary transfer station 3 is closed, which is thereby fed by the battery 6 of the tractor vehicle 5 and drives the continuous conveyor 30. By means of the motor 27, which is also fed by the battery 6 of the tractor vehicle 5, the continuous conveyor 25 of the trailer-train trailer 2 is also driven accordingly.

For the delivery of a load L from the trailer-train trailer 2 to the stationary transfer station 3, the motors 27, 32 are operated so that the load L is displaced in the direction x (see FIG. 1) at the same height from the continuous conveyor 25 of the trailer-train trailer 2 to the continuous conveyor 30 of the transfer station 3. Accordingly, to receive a load L from the transfer station 3 onto the trailer-train trailer 2, the motors 27, 32 are operated so that the load L is displaced in the direction –x (see FIG. 1) at the same height from the continuous conveyor 30 of the transfer station 3 onto the continuous conveyor 25 of the trailer-train trailer 2.

When the sensors 46 detect an erroneous position that differs from the correct handling position of the trailer-train trailer 2, the contact 52 remains de-energized so that the power supply of the motor 32 remains interrupted.

Figure 1:
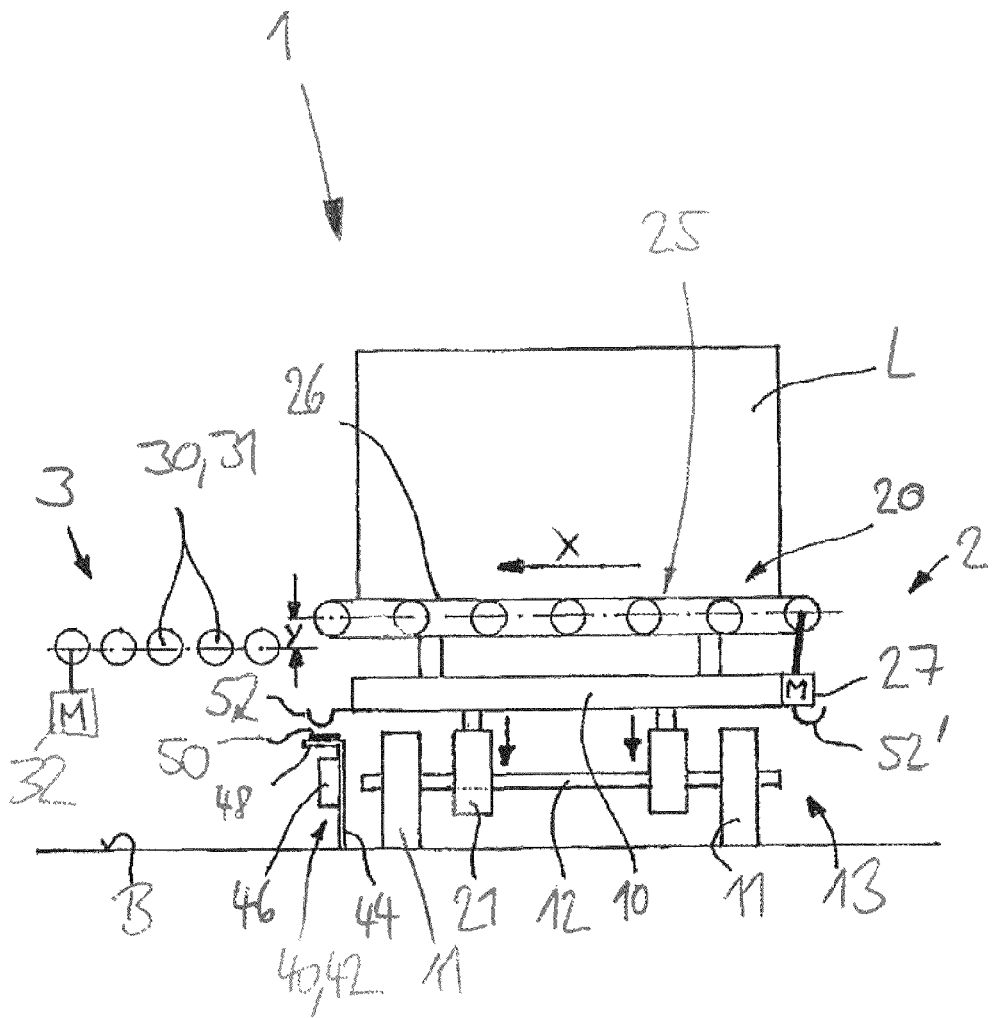
FIG. 1 is a schematic front view of a first embodiment of a device according to the disclosure.

The support frame 10—as illustrated in FIG. 1—can also have, on the opposite longitudinal side, at least one contact 52' so that the described load transfer or load acceptance can also be carried out when the trailer-train trailer 2 is driven into the transfer station 3 in the reverse position.

In the exemplary embodiment illustrated and FIGS. 6 to 11, the trailer-train trailer 2 has a rigid support frame 10 that is provided with the chassis 13, which support frame 10 is provided with the continuous conveyor 25. The trailer-train trailer 2 illustrated in FIGS. 6 to 11 is therefore in the form of a rigid trailer-train trailer 2 without a lift table.

In the exemplary embodiment illustrated in FIGS. 6 to 11, the stationary transfer station 3 is provided with two sensors 46 at a horizontal distance from each other which, in a predetermined handling position of the trailer-train trailer 2, detect the correct handling position of the trailer-train trailer 2 by means of mating sensors (not shown), in which position the continuous conveyor 25 of the trailer-train trailer 2 must be oriented with respect to the additional continuous conveyor 30 of the stationary transfer station 3.

The trailer-train trailer 2 illustrated in FIGS. 6 to 11 is provided with at least one live contact 52 which is connected with the battery 6 of the tractor vehicle 5.

The contact 52 is located in a vertically adjustable manner on the support frame 10 and its height can be adjusted by means of a lifting mechanism (not illustrated in any further detail) relative to the support frame 10 of the trailer-train trailer 2.

The lifting mechanism is preferably in the form of an electrical lifting mechanism that is supplied with power by the battery 6 of the tractor vehicle 5.

The trailer-train trailer 2 illustrated in FIGS. 6 to 11 is connected by means of a connecting cable with the battery 6 of the tractor vehicle 5 for the electrical supply of the electric motor 27 of the continuous conveyor 25 and/or of the lifting mechanism for the contacts 52.

The stationary transfer station of the exemplary embodiment illustrated in FIGS. 6 to 11 is provided with two contacts located at some distance from each other which are connected with the additional motor 32 of the additional continuous conveyor 30 of the stationary transfer station 3.

The contact 52 of the trailer tractor-trailer 2 is preferably located on a bracket 60, the height of which can be adjusted by means of the lifting mechanism. The bracket 60 in the exemplary embodiment illustrated in FIGS. 6 to 11 is also provided with a support device 61, such as a support roller 62, for example, to support the trailer tractor-trailer 2 on the floor B.

Figure 8:
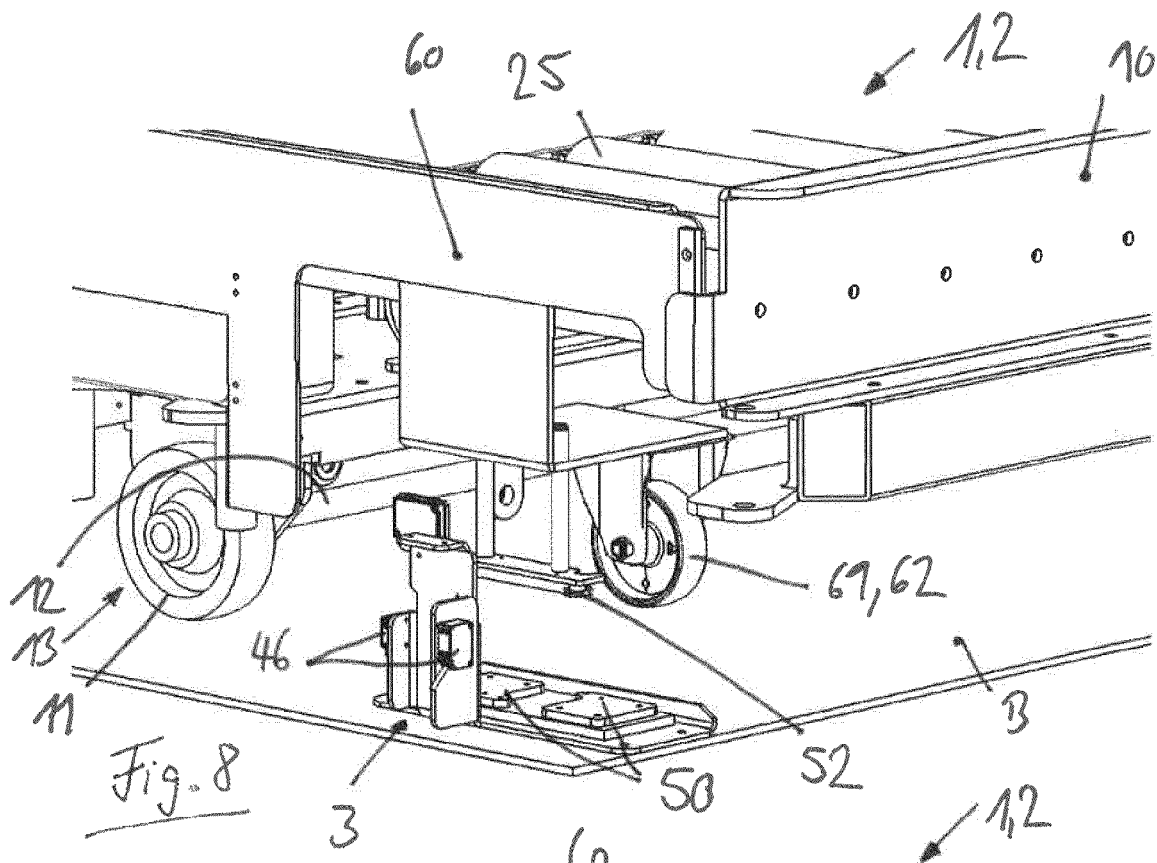
FIG. 8 is a detailed view of FIG. 6 in an enlarged illustration.

The bracket 60 is preferably located laterally on the continuous conveyor 25 and projects with its upper edge in the raised position, which is illustrated in FIGS. 6, 8 and 10, beyond the height of the continuous conveyor 25.

The contact 52 is located on the bracket 60 of the trailer-train trailer 2 such that when the bracket 60 is lowered, it comes into contact with the two contacts 50 of the transfer station 3. Preferably the contact 52 of the trailer tractor-trailer 2 is formed by a switching plate.

Figure 9:
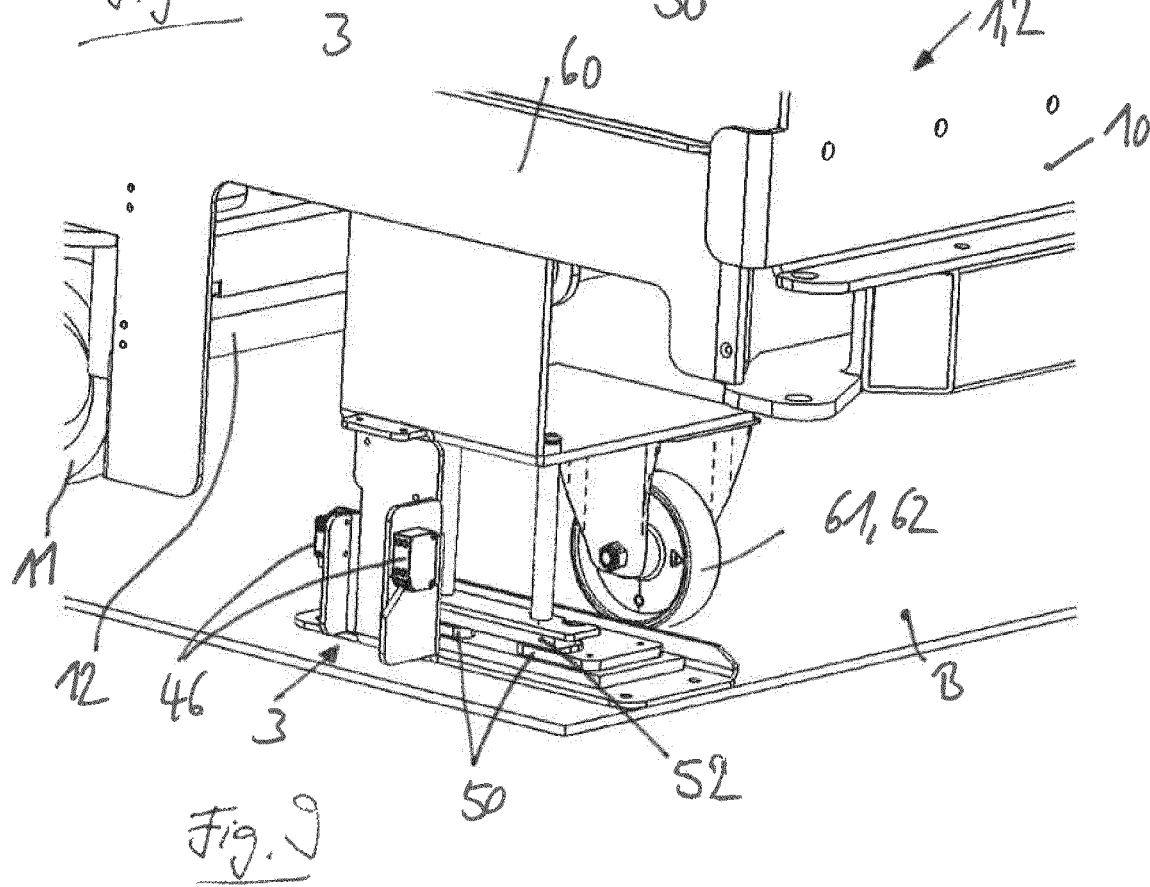
FIG. 9 is a detailed view of FIG. 7 in an enlarged illustration.

When the trailer-train trailer 2 according to the exemplary embodiment illustrated in FIGS. 6 to 11 has arrived in the transfer station 3 illustrated in FIGS. 6, 8 and 10, the two sensors 46 determine the position of the trailer-train trailer 2, which can still be corrected, until the predetermined handling position of the trailer-train trailer 2 relative to the stationary transfer station 3 with its continuous conveyor 30 has been reached. In response to a command from the trailer-train side, which can be given, for example, by a driver of the tractor vehicle 5 or can be issued automatically, the lifting mechanism receives a signal to lower the bracket 60 so that the contact 52 connected with the battery 6 of the tractor vehicle 5 of the trailer-train trailer 2 which is located on the bracket 60 comes into contact with the contacts 50 of the stationary transfer station 3, as illustrated in FIGS. 7, 9 and 11. The support element 61 that is formed by the support roller 62 also comes into contact with the floor B to stabilize the trailer-train trailer 2. After a brief delay of approximately half a second, which is to prevent arcing, the trailer-side contact 52 is supplied with current from the battery 6 of the tractor vehicle 5 so that the circuit to supply power to the additional motor 32 of the additional continuous conveyor 30 of the stationary transfer station 3 is closed, which is thereby fed by the battery 6 of the tractor vehicle 5 and drives the continuous conveyor 30. By means of the motor 27 which is also fed by the battery 6 of the tractor vehicle 5 the continuous conveyor 25 of the trailer-train trailer 2 is driven correspondingly.

In the exemplary embodiment illustrated in FIGS. 6 to 11, the continuous conveyor 25 of the trailer-train trailer 2 is positioned at the same height as the continuous conveyor 30 of the transfer station 3, so that in the specified handling position the load L can be transferred on the same level from the continuous conveyor 25 of the trailer-train trailer 2 to the continuous conveyor 30 of the transfer station 3 or from the continuous conveyor 30 of the transfer station 3 to the continuous conveyor 25 of the trailer-train trailer 2.

For the delivery of a load L from the trailer-train trailer 2 to the stationary transfer station 3, the motors 27, 32 are operated so that the load L is displaced on the same level from the continuous conveyor 25 of the trailer tray trailer 2 onto the continuous conveyor 30 of the transfer station 3. Correspondingly, for the acceptance of a load L from the transfer station 3 onto the trailer-train trailer 2, the motors 27, 32 are operated so that the load L is displaced on the same level from the continuous conveyor 30 of the transfer station 3 onto the continuous conveyor 25 of the trailer-train trailer 2.

When the sensors 46 identify an erroneous position that differs from the correct handling position of the trailer-train trailer 2, the contact 52 remains de-energized so that the power supply to the motor 32 remains interrupted.

Because the additional motor 32 of the additional continuous conveyor 30 of the stationary transfer station 3 is fed by the battery 6 of the tractor vehicle 5 of the trailer train 1 for the delivery or acceptance of a load, the stationary transfer station 3 does not need an electrical connection and therefore no power connection to a power network of the building in which the stationary transfer station 3 is located. That results in a high degree of flexibility in the location of the stationary transfer station 3 and the installation location of the stationary transfer station 3 can be changed in a simple matter because the stationary transfer station 3 does not need a separate power connection to a power network of the building and therefore when there is a change in the installation location, no additional installation effort or expense is required for the power connection of the motor 32 of the continuous conveyor 30 of the transfer station 3 the power network of the building.

The invention claimed is:

1. A device comprising: a stationary transfer station; and a trailer train comprising at least one trailer-train trailer for a transfer of loads from the trailer-train trailer into the transfer station,
    wherein the trailer-train trailer is provided with a continuous conveyor driven by a motor to receive the load,
    wherein the motor of the continuous conveyor of the trailer-train trailer is fed by a battery of the trailer train,
    wherein an additional continuous conveyor to receive the loads are driven by an additional motor located in the transfer station, and
    wherein in a predetermined handling position, the additional motor of the additional continuous conveyor in the transfer station is fed by the battery of the trailer train.

2. The device according to claim 1, wherein at least one contact is provided on the transfer station with which, in the predetermined handling position, at least one switch contact of the trailer-train trailer that is in connection with the battery of the trailer train is connected and thereby closes a circuit to supply power to the additional motor of the additional continuous conveyor on the transfer station.

3. The device according to claim 1, wherein, on the transfer station, a sensor device is provided to detect the predetermined handling position of the trailer-train trailer.

4. The device according to claim 1, wherein the trailer train has a tractor vehicle and a battery of the tractor vehicle takes over power supply to the motor of the continuous conveyor of the trailer-train trailer and power supply of the additional motor of the additional continuous conveyor the transfer station.

5. The device according to claim 2, wherein the contact of the transfer station is located on a floor.

6. The device according to claim 2, wherein the contact of the transfer station is attached to a stationary rail.

7. The device according to claim 6, wherein the sensor device is attached to the stationary rail.

8. The device according to claim 2, wherein the contact of the transfer station is attached to the transfer station.

9. The device according to claim 2, wherein the trailer-train trailer is provided with two switch contacts at a horizontal distance from each other, which are reversible to reverse a direction of rotation of the additional motor of the continuous conveyor of the transfer station.

10. The device according to claim 1, wherein, in the predetermined handling position, the continuous conveyor of the trailer-train trailer driven by the motor is oriented at a same height as the additional continuous conveyor of the transfer station.

11. The device according to claim 1, wherein the continuous conveyor of the trailer-train trailer is in the form of a conveyor belt, a roller conveyor, or a chain conveyor.

12. The device according to claim 1, wherein the additional continuous conveyor of the transfer station is in the form of a conveyor belt, a roller conveyor, or a chain conveyor.

13. The device according to claim 1, wherein the trailer-train trailer comprises a lift table which is provided with the continuous conveyor.

14. The device according to claim 13, wherein the lift table is provided with a contact.

15. The device according to claim 13, wherein a height of the lift table relative to a chassis of the trailer-train trailer is adjusted by a lifting mechanism.

16. The device according to claim 13, wherein, in the predetermined handling position when the lift table is lowered, the switch contact of the trailer-train trailer that is connected to the battery of the trailer train strikes the contact of the transfer station.

17. The device according to claim 13, wherein the trailer-train trailer has a support frame that supports the lift table.

18. The device according to claim 2, wherein the trailer-train trailer has a support frame provided with a chassis, wherein the support frame is provided with the continuous conveyor.

19. The device according to claim 18, wherein a height of the switch contact located on the support frame adjustable, and the height is adjusted by a lifting mechanism relative to the support frame of the trailer-train trailer.

20. The device according to claim 19, wherein the switch contact is located on a bracket, a height of which is adjusted by the lifting mechanism, wherein the bracket is provided with a support device.

21. The device according to claim 20, wherein the bracket is located laterally on the continuous conveyor and, in the raised position, projects above a level of the continuous conveyor.

* * * * *

UNITED STATES PATENT AND TRADEMARK OFFICE
CERTIFICATE OF CORRECTION

| | |
|---|---|
| PATENT NO. | : 11,364,833 B2 |
| APPLICATION NO. | : 16/651967 |
| DATED | : June 21, 2022 |
| INVENTOR(S) | : Fritz Berghammer |

It is certified that error appears in the above-identified patent and that said Letters Patent is hereby corrected as shown below:

In the Claims

Column 10, Line 45, Claim 4, delete "the" and insert -- on the --

Column 12, Line 6, Claim 19, delete "adjustable," and insert -- is adjustable, --

Signed and Sealed this
Thirtieth Day of August, 2022

Katherine Kelly Vidal
*Director of the United States Patent and Trademark Office*